(12) United States Patent
Kim et al.

(10) Patent No.: US 12,197,980 B2
(45) Date of Patent: Jan. 14, 2025

(54) QR CODE INTO WHICH IMAGE IS INSERTED, AND GENERATION METHOD THEREFOR

(71) Applicant: INOFRIENDS INC., Seoul (KR)

(72) Inventors: Sung Soo Kim, Seoul (KR); Su Bon Kim, Daejeon (KR)

(73) Assignee: INOFRIENDS INC., Seoul (KR)

( * ) Notice: Subject to any disclaimer, the term of this patent is extended or adjusted under 35 U.S.C. 154(b) by 0 days.

(21) Appl. No.: 18/565,604

(22) PCT Filed: Oct. 19, 2021

(86) PCT No.: PCT/KR2021/014527
§ 371 (c)(1),
(2) Date: Nov. 30, 2023

(87) PCT Pub. No.: WO2022/255557
PCT Pub. Date: Dec. 8, 2022

(65) Prior Publication Data
US 2024/0265224 A1 Aug. 8, 2024

(30) Foreign Application Priority Data
May 31, 2021 (KR) .......................... 10-2021-0070289

(51) Int. Cl.
*G06K 19/06* (2006.01)
(52) U.S. Cl.
CPC .............................. *G06K 19/06037* (2013.01)
(58) Field of Classification Search
CPC .. G06K 19/06037; G06K 7/14; G06K 7/1417; G06K 19/06046; G06K 19/06056; G06K 19/06
See application file for complete search history.

(56) References Cited

U.S. PATENT DOCUMENTS 5,260,556 A * 11/1993 Lake ................. G06K 19/06037
235/494
8,459,567 B2 * 6/2013 Hovis .................. G01B 11/165
235/494
(Continued)

FOREIGN PATENT DOCUMENTS

JP   2013-030184 A   2/2013
JP   2016-004535 A   1/2016
(Continued)

OTHER PUBLICATIONS

International Search Report for PCT/KR2021/014527 mailed on Mar. 16, 2022.

*Primary Examiner* — Jamara A Franklin
(74) *Attorney, Agent, or Firm* — The PL Law Group, PLLC

(57) ABSTRACT

A QR code according to an embodiment includes a code frame formed from a first frame and a second frame spaced a predetermined distance apart from the first frame inside the first frame; one or more position detection patterns arranged in a space formed by means of the interval between the first frame and the second frame; a data pattern in which a plurality of codes are recorded on the basis of information data formed from a plurality of first data cells and a plurality of second data cells arranged along the outer circumferential surface of the code frame in the space; and an image inserted into an image area formed inside the second frame.

14 Claims, 6 Drawing Sheets

(56) References Cited

U.S. PATENT DOCUMENTS 9,659,201 B2 *  5/2017  Yoshida ............... G06K 7/1417
9,892,300 B2 *  2/2018  Hosokane ........ G06K 19/06037

FOREIGN PATENT DOCUMENTS

| JP | 2020-123377 A | 8/2020 |
| KR | 10-2005-0119807 A | 12/2005 |
| KR | 10-2011-0006645 A | 1/2011 |

* cited by examiner

QR CODE INTO WHICH IMAGE IS INSERTED, AND GENERATION METHOD THEREFOR

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/014527 filed on Oct. 19, 2021, which claims priority to the benefit of Korean Patent Application No. 10-2021-0070289 filed in the Korean Intellectual Property Office on May 31, 2021, the entire contents of which are incorporated herein by reference.

BACKGROUND

1. Technical Field

The present disclosure relates to a quick response (QR) code, and more particularly, to a QR code having various shapes to improve identification and advertisement effect by images inserted therein, while enhancing aesthetics.

2. Background Art

QR codes are two-dimensional barcodes, overcoming the capacity limitations of the previously widely used one-dimensional barcode and expanding their format and contents, that store character data in addition to numbers by including vertical and horizontal information. These QR codes are usually read by utilizing a digital camera, dedicated scanner, or smartphone to be utilized.

Initially, QR codes were widely used for product management, such as automobile parts production management, and later were developed into an advertising tool printed on various print mediums, etc. and allowing users to search for product information and Internet information through QR codes.

For example, a QR code is printed and inserted into a magazine advertisement, and when people who see the QR code recognize it by capturing an image of the QR code with their smartphone, they may be connected to the website stored in the QR code and be provided with more detailed information, thereby developing the QR code into an advertising tool. To this end, most smartphones support applications that allow scanning and recognition of QR codes.

FIG. 1 is a diagram illustrating the conventional QR code.

Referring to FIG. 1, the conventional QR code has a square shape. The QR code includes three position detection patterns 10 and a data pattern 20 arranged between the position detection patterns 10.

The position detection pattern 10 defines a size, direction, or rotation angle of the QR code. For example, in the QR code of FIG. 1, two position detection patterns 10 are disposed at the top and one position detection pattern 10 is disposed at the bottom. Accordingly, even if a user images the QR code at various angles, the portion in which the two position detection patterns 10 are disposed is recognized as an upper portion of the QR code.

The data pattern 20 includes a plurality of black data cells 21 and white data cells 22. Each of the black data cells 21 and white data cells 22 has a square shape, and predetermined information data is recorded and stored in each cell.

The conventional QR code described above increases the capacity of data that may be stored compared to the existing barcode, and thus companies, etc. use the QR code to provide various information to a large number of people, such as advertising information for the company's products. However, since the conventional QR code includes the plurality of data cells 21 and 22 arranged in a two-dimensional barcode form, it was impossible to recognize or predict the information included in the QR code from the human perspective.

In other words, it is impossible to predict what information a conventional QR code includes by itself. Therefore, people should perform the process of imaging and recognizing the QR code through a device, such as a smartphone, which causes inconvenience as the QR code recognition process is cumbersome, thereby reducing the advertisement effect using QR codes.

In addition, since conventional QR codes are mostly formed in a square shape by the plurality of position detection patterns 10 arranged at the corners, there is a problem in that the aesthetics of the QR code are reduced and people's interest is reduced.

SUMMARY

The present disclosure provides a QR code having various shapes to improve identification and advertisement effect by images inserted therein, while enhancing aesthetics, and a method of generating the same.

According to an embodiment of the present disclosure, a QR code includes: a code frame including a first frame and a second frame formed inside the first frame and spaced apart from the first frame at a certain interval; one or more position detection patterns disposed in a space formed by the interval between the first frame and the second frame; a data pattern including a plurality of first data cells and a plurality of second data cells arranged along an outer circumferential surface of the code frame in the space, and in which a plurality of codes based on information data provided from outside are recorded; and an image inserted into an image area formed inside the second frame.

According to an embodiment of the present disclosure, a method of generating a QR code includes: receiving, by a code generating server, information data and an image from a manufacturer terminal; classifying the received information data into low-capacity data and high-capacity data and storing the high-capacity data in a database together with a storage position value; generating a first frame in a closed loop form and a second frame in a closed loop form spaced apart from the first frame at a predetermined interval inside the first frame based on the classified information data; generating one or more position detection patterns in a space between the first frame and the second frame; generating a data pattern in which a plurality of codes are recorded by combining a plurality of first data cells and a plurality of second data cells in the space based on the classified information data; and forming an image area inside the second frame and inserting the image into the image area.

The QR code into which an image according to the present disclosure is inserted may be generated in various forms by a polygonal code frame that forms an outer layout, thereby enhancing the aesthetics compared to the existing QR code.

In addition, the QR code of the present disclosure has a logo image related to the information to be provided through the QR code inserted in the internal region, so that many users may predict information included in the code through visual recognition for the logo image of the QR code, thereby increasing code identification and improving the advertisement effect for individuals, companies, or their products through QR code.

DETAILED DESCRIPTION

Figure 1:
FIG. 1 is a diagram illustrating a conventional QR code.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification Throughout the specification, when a portion is referred to as "including" a certain element, it means that it may further include other elements rather than exclude other elements, unless specifically indicates otherwise.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are described in the following description as needed. Thus, the terms used in this specification should be construed based on the overall content of this specification together with the actual meanings of the terms rather than their simple names or meanings.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

As used herein, the singular forms "a", "an," and "the" are intended to include the plural forms as well, unless the context clearly indicated otherwise.

It will be further understood that the terms "comprises", "comprising", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

In the description, the word "module" or "unit" refers to a software component, a hardware component, or a combination thereof, which is capable of carrying out at least one function or operation. A plurality of modules or units may be integrated into at least one module and implemented as at least one processor except for those modules or units that need to be implemented in specific hardware.

Figure 2:
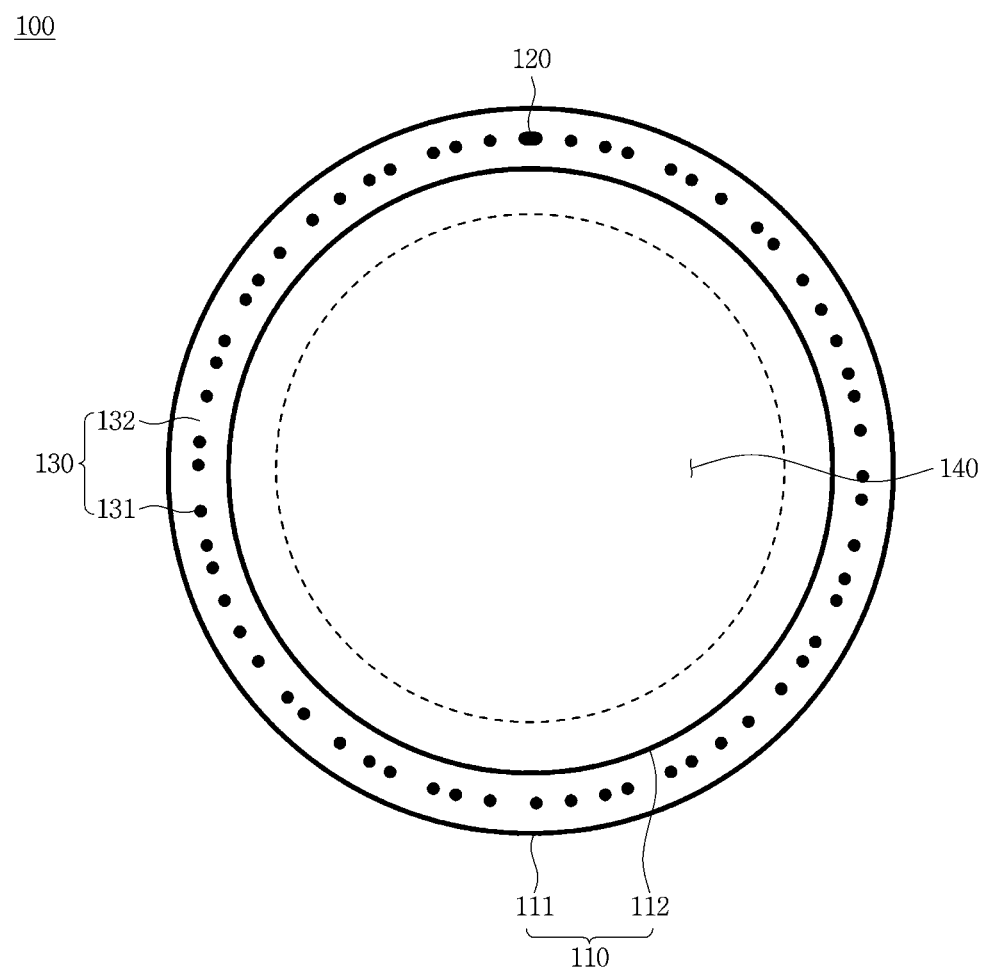
FIG. 2 is a diagram illustrating a QR code with an inserted image according to an embodiment of the present disclosure.

FIG. 2 is a diagram illustrating a QR code with an inserted image according to an embodiment of the present disclosure.

Referring to FIG. 2, a QR code 100 of the present embodiment may include a code frame 110, a position detection pattern 120, a data pattern 130, and an image area 140.

The code frame 110 may configure a layout, such as a shape or size of the QR code 100. The code frame 110 is formed as a polygonal closed loop of various shapes. In the present embodiment, the code frame 110 forming a circular closed loop will be described as an example.

The code frame 110 may include a first frame 111 and a second frame 112. The first frame 111 and the second frame 112 may be formed in the same shape, and each may form a closed loop and overlap each other.

The first frame 111 and the second frame 112 may be spaced apart from each other at a predetermined interval to form a space in which the position detection pattern 120 and the data pattern 130, which will be described below, are arranged. A width of the space may vary depending on the arrangement of the data pattern 130.

In addition, according to another embodiment of the present disclosure, the code frame 110 may include only one of the first frame 111 and the second frame 112. At this time, the position detection pattern 120 and the data pattern 130 may be disposed to be adjacent to an outer circumferential surface of one frame.

One or more position detection patterns 120 may be arranged in the space formed by the first frame 111 and the second frame 112 of the code frame 110. The position detection pattern 120 may determine a direction or angle of the QR code 100 and may have a polygonal shape in various colors.

For example, in the QR code 100 of the present embodiment, a position in which the position detection pattern 120 is disposed may be determined as an upper portion of the code. Accordingly, even if a user images the QR code 100 with the top/bottom reversed or the QR code 100 rotated in a predetermined direction through the user's terminal, the user's terminal may correct the direction of the QR code 100 through recognition of the position detection pattern 120 described above. In addition, the user's terminal may recognize a plurality of data patterns 130 in one direction based on the position detection pattern 120 of the QR code 100 and obtain the information recorded therein.

The data pattern 130 may be arranged to surround the outer circumferential surface of the first frame 111 or the second frame 112 in the space between the first frame 111 and the second frame 112. The data pattern 130 may include a plurality of first data cells 131 and a plurality of second data cells 132 having different colors, for example, inverted colors. The plurality of first data cells 131 and second data cells 132 may have a polygonal shape, such as a square, circle, or triangle.

The plurality of first data cells 131 and second data cells 132 of the data pattern 130 may be combined according to parameters, such as color, shape, or arrangement position. The plurality of first data cells 131 and second data cells 132 may be combined to be arranged in the form of a single closed loop, that is, a single closed curve, in the space between the first frame 111 and the second frame 112. According to the combination of the first data cell 131 and the second data cell 132, a plurality of pieces of information of the QR code 100, such as a data code, security code, or version code, may be recorded and stored in the data pattern 130.

The data code may be a code recorded based on information provided to multiple users from the QR code 100. The security code may be a code recorded to verify the data code. In addition, the version code may be a code recorded for information on a version of the QR code 100. These data code, security code, and version code may be generated based on information data provided by a manufacturer who wants to generate and distribute the QR code 100.

In addition, the data code of the data pattern 130 may be recorded in a direct recording method or an indirect recording method depending on the size or amount of information data input from the outside. Here, the direct recording method is a method of recording the information data itself and may be used to record relatively low-capacity data, such as low-capacity photos or documents. The indirect recording method is a method of recording an access address of an external device in which information data is stored, such as a server (not shown), and may be used to record relatively high-capacity data, for example, information data, such as high-capacity video or web pages. These recording methods of data codes will be described in detail below with reference to the drawings.

Meanwhile, the space between the first frame 111 and the second frame 112 in which the data pattern 130 is disposed may be divided into multiple regions, and the data code, security code, and version code described above may be recorded in each region.

For example, the space may be divided into a first region (not shown) in which the data code is recorded, a second region (not shown) in which the security code is recorded, and a third region (not shown) in which the version code is recorded. At this time, the first region in which the data code having a relatively large amount of information compared to the security code or version code is recorded may have a larger section range than other regions.

The image area 140 may be formed inside the second frame 112 of the code frame 110. This image area 140 may have a size that does not overlap the second frame 112.

One or more images related to information recorded in the data pattern 130, that is, information to be provided to users through the QR code 100, may be inserted into the image area 140. The image inserted into the image area 140 may be a logo of a company that wants to provide information through the QR code 100 or a photo of a product of the company.

As described above, the QR code 100 of the present embodiment may be formed in various shapes by the polygonal code frame 110 forming a closed loop, thereby enhancing aesthetics compared to existing QR codes. In addition, since the QR code 100 is generated by inserting various images related to the information to be provided by the QR code 100, for example, images, such as photos or logos, into the internal region, many users may predict information included in the QR code 100 through visual recognition of the image inserted into the QR code 100, thereby increasing code identification and improving the advertisement effect of companies or products through the QR code 100.

Figure 3:
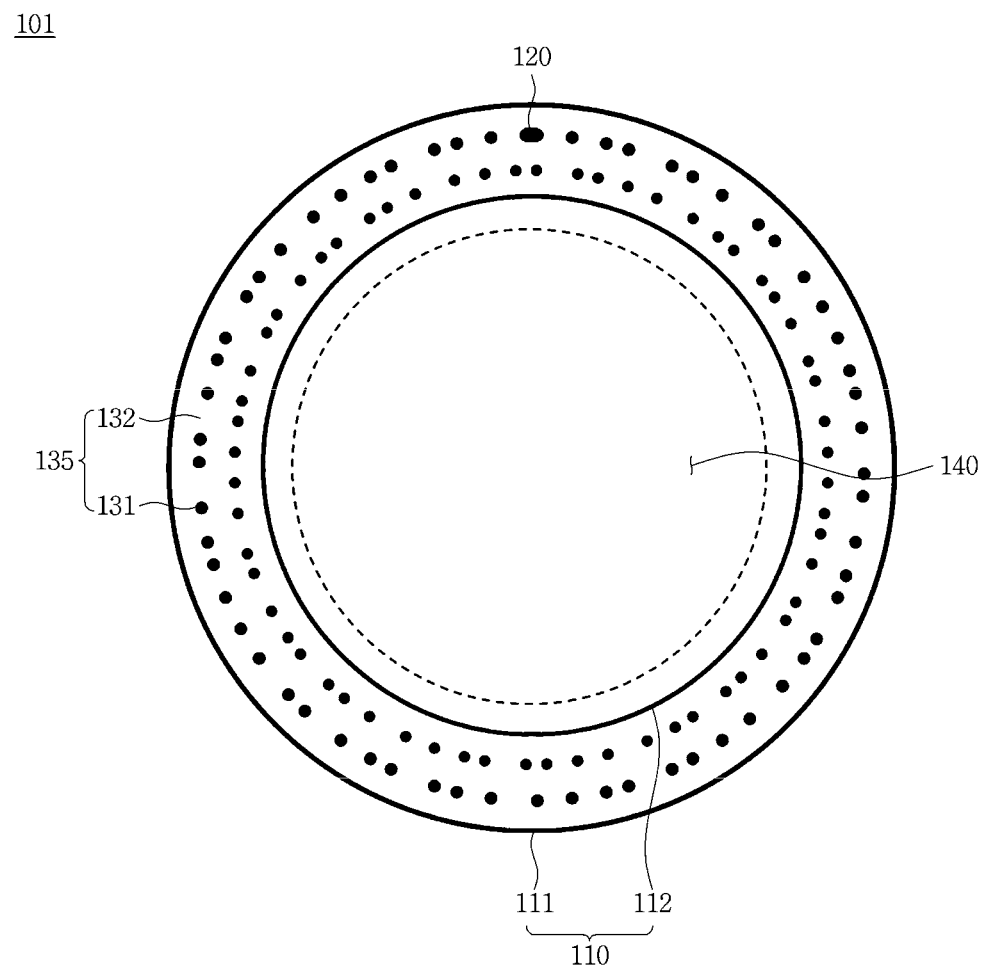
FIG. 3 is a diagram illustrating a QR code with an inserted image according to another embodiment of the present disclosure.

FIG. 3 is a diagram illustrating a QR code with an inserted image according to another embodiment of the present disclosure.

A QR code 101 shown in FIG. 3 has the substantially same configuration, except that a plurality of first data cells 131 and second data cells 132 constituting the data pattern 135 have a form of multiple closed loops, compared to the QR code 100 described above with reference to FIG. 2. Thus, identical members will be denoted by identical reference numerals and detailed description thereof will be omitted.

As shown in FIG. 3, the QR code 101 of the present embodiment may include a code frame 110, a position detection pattern 120, a data pattern 135, and an image area 140.

The code frame 110 may include a first frame 111 and a second frame 112 spaced apart from each other at a predetermined interval to form a space in which the position detection pattern 120 and the data pattern 135 are arranged. The first frame 111 and the second frame 112 may have a polygonal shape, and each may be formed in the form of a closed loop.

The position detection pattern 120 may be formed in a polygonal shape of various colors, and one or more position detection patterns 120 may be disposed in the space formed by the first frame 111 and the second frame 112 of the code frame 110. The position detection pattern 120 may determine a direction or angle of the QR code 101.

The data pattern 135 may be arranged to surround the outer circumferential surface of the first frame 111 or the second frame 112 in the space between the first frame 111 and the second frame 112. The data pattern 135 may include a plurality of first data cells 131 and a plurality of second data cells 132 having different colors, for example, inverted colors. The plurality of first data cells 131 and second data cells 132 may have a polygonal shape, such as a square, circle, or triangle.

A plurality of first data cells 131 and second data cells 132 of the data pattern 135 are combined according to parameters, such as color, shape, or arrangement position so that various information of the QR code 101, that is, a data code, a security code, or a version code may be recorded.

Here, in the data pattern 135 of the present embodiment, a plurality of first data cells 131 and second data cells 132 are arranged in the form of multiple closed loops, for example, in the form of double closed curves having different sizes, and thus, the amount of information recorded and stored in the data pattern 135 may be increased.

That is, in the data pattern 135 of the QR code 101 shown in FIG. 3, the number of first data cells 131 and second data cells 132 may be increased compared to the data pattern 130 of the QR code 100 described above with reference to FIG. 2. As the number of data cells increases, the amount of information data that may be stored in the QR code 135 of the present embodiment may increase, which allows a manufacturer to provide various types of information to a large number of users through the QR code 101.

However, in the QR code 101 of the present embodiment, as the number of first data cells 131 and second data cells 132 of the data pattern 135 increases, a width of the space between the first frame 111 and the second frame 112 of the code frame 110 should be increased. Accordingly, the size of the image area 140 formed inside the second frame 112 may be relatively reduced compared to the image area 140 described above with reference to FIG. 2. That is, when the QR code 100 of FIG. 2 and the QR code 101 of FIG. 3 have the same size, the image area 140 of the QR code 101 of FIG. 3 may have a size less than that of the image area 140 of the QR code 100 of FIG. 2.

Various images may be inserted into the image area 140 to correspond to the information recorded in the data pattern 135. Accordingly, users may predict the information included in the QR code 101 through visual recognition of the image inserted into the image area 140, thereby increasing code identification, which allows the advertisement effect of individuals, companies, or their products to be improved through the QR code.

Figure 4:
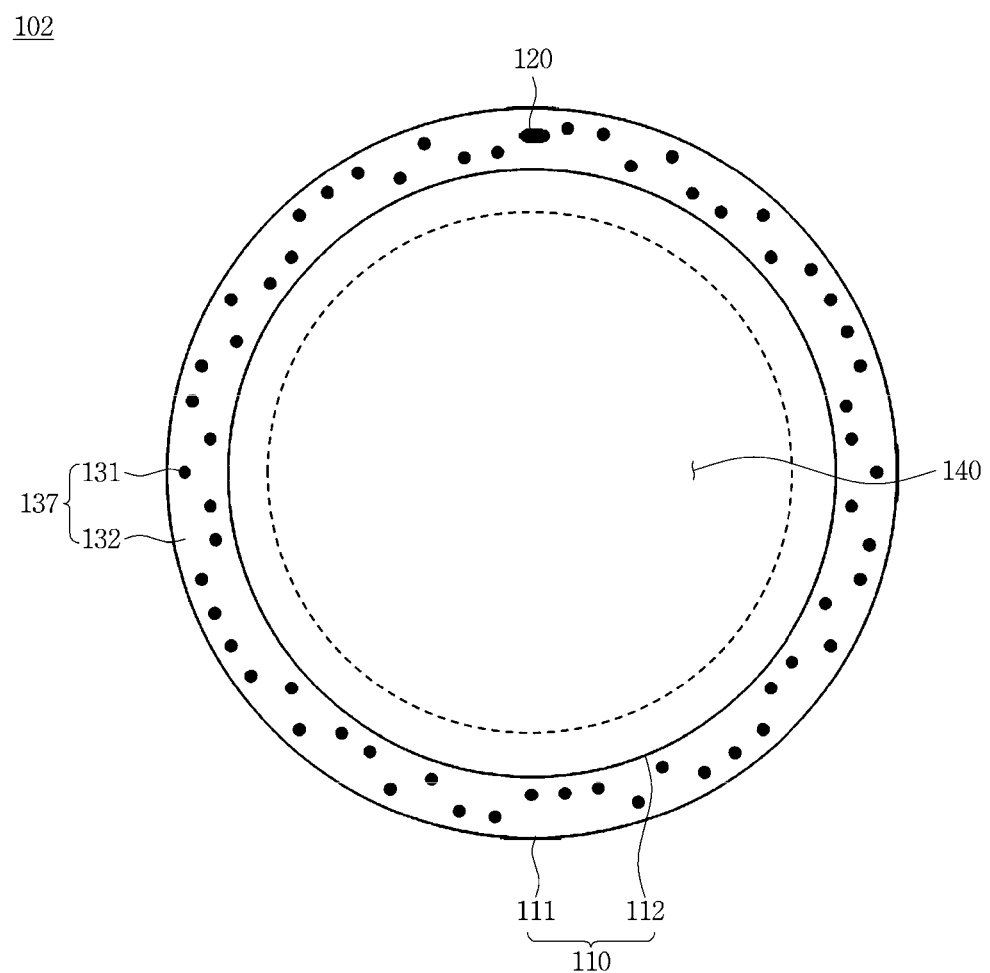
FIG. 4 is a diagram illustrating a QR code with an inserted image according to another embodiment of the present disclosure.

FIG. 4 is a diagram illustrating a QR code with an inserted image according to another embodiment of the present disclosure.

The QR code 102 shown in FIG. 4 has substantially the same configuration, except that a plurality of first data cells 131 and second data cells 132 constituting a data pattern 137 are arranged in a zigzag shape compared to the QR codes 100 and 101 described above with reference to FIGS. 2 and 3. Thus, identical members will be denoted by identical reference numerals and detailed description thereof will be omitted.

As shown in FIG. 4, the QR code 102 of the present embodiment may include a code frame 110, a position detection pattern 120, a data pattern 137, and an image area 140.

The code frame 110 may include a first frame 111 and a second frame 112 spaced apart from each other at a predetermined interval to form a space in which the position detection pattern 120 and the data pattern 137 are arranged. The first frame 111 and the second frame 112 may have a polygonal shape, and each may be formed in the form of a closed loop.

The position detection pattern 120 may be formed in a polygonal shape of various colors and one or more position detection patterns 120 may be arranged in the space formed by the first frame 111 and the second frame 112 of the code frame 110. The position detection pattern 120 may determine a direction or angle of the QR code 102.

The data pattern 137 may be arranged to surround an outer circumferential surface of the first frame 111 or the second frame 112 in the space between the first frame 111 and the second frame 112. The data pattern 137 may include a plurality of first data cells 131 and a plurality of second data cells 132 having different colors, for example, inverted colors. The plurality of first data cells 131 and second data cells 132 may have a polygonal shape, such as a square, circle, or triangle.

The plurality of first data cells 131 and second data cells 132 of the data pattern 137 may be arranged in a zigzag shape. Accordingly, as for the combination of the plurality of first data cells 131 and second data cells 132 of the data pattern 137 of the present embodiment, the plurality of first data cells 131 and second data cells 132 may be combined in various forms according to parameters of an arrangement form between a pair of first data cells 131 adjacent to each other, that is, an angle therebetween, as well as colors, shapes, and positions, so that information recorded in the data pattern 137, that is, the size of the data code, the security code, or the version code may be increased.

That is, the size of information stored in the data pattern 137 may be increased by increasing a combination variable, i.e., a combination parameter, of the data pattern 137 of the QR code 102 shown in FIG. 4 according to a zigzag arrangement of the plurality of first data cells 131 and second data cells 132. Therefore, the QR code 102 of the present embodiment may store more data even if a size of the image area 140 is not substantially reduced compared to the QR code 100 described above with reference to FIG. 2, and therefore, the manufacturer may provide various types of information to multiple users through the QR code 102.

Various images may be inserted into the image area 140 to correspond to the information recorded in the data pattern 137. Accordingly, users may predict the information included in the QR code 102 through visual recognition of the image inserted into the image area 140, thereby increasing code identification, as a result, an advertisement effect of individuals, companies, or their products may be improved through the QR code 102.

Figure 5:
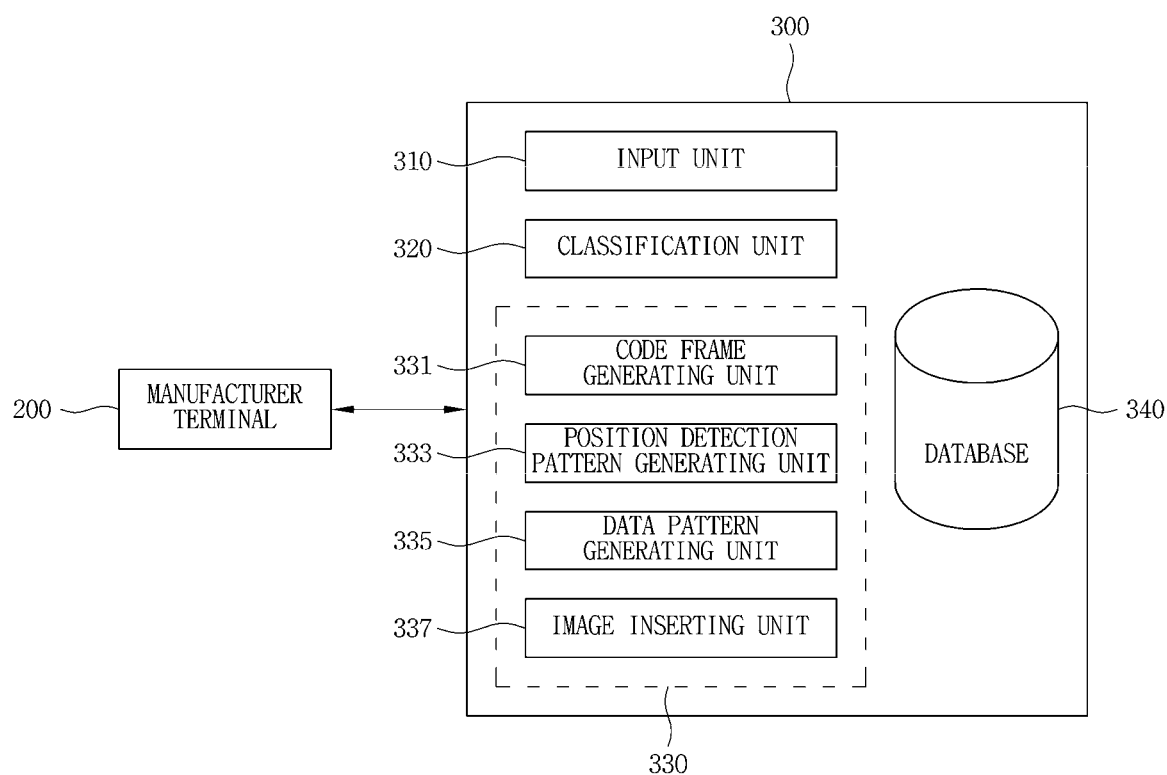
FIG. 5 is a diagram illustrating a system for generating a QR code of the present disclosure.

FIG. 5 is a diagram illustrating a system for generating a QR code of the present disclosure.

Referring to FIG. 5, a QR code generating system (hereinafter referred to as a generating system) of the present embodiment may include a manufacturer terminal 200 possessed by a manufacturer, such as an individual or company, who wants to generate the QR codes 100, 101, and 102 and a code generating server 300 connected to and communicates with the manufacturer terminal 200 through a wired/wireless network.

The code generating server 300 may include an input unit 310 that receives information data and images from the manufacturer terminal 200, a classification unit 320 that classifies the information data received in the input unit 310 according to a size or capacity, a code generating unit 330 that generates the QR codes 100, 101, and 102 based on the classified information data and images, and a database 340 that stores a portion of the information data included in the generated QR codes 100, 101, and 102.

In addition, the code generating unit 330 may include a code frame generating unit 331 that generates a polygonal code frame 110 including a first frame 111 and a second frame 112 disposed to be spaced apart from each other at a predetermined angle to form closed loops, respectively, a position detection pattern generating unit 333 that generates one or more position detection patterns 120 disposed in a space between the first frame 111 and the second frame 112, a data pattern generating unit 335 that generates data patterns 130, 135, and 137 including a plurality of first data cells 131 and second data cells 132 arranged in the space, and an image inserting unit 337 that inserts an image, such as a photo or logo, into the image area 140 inside the second frame 112.

Figure 6:
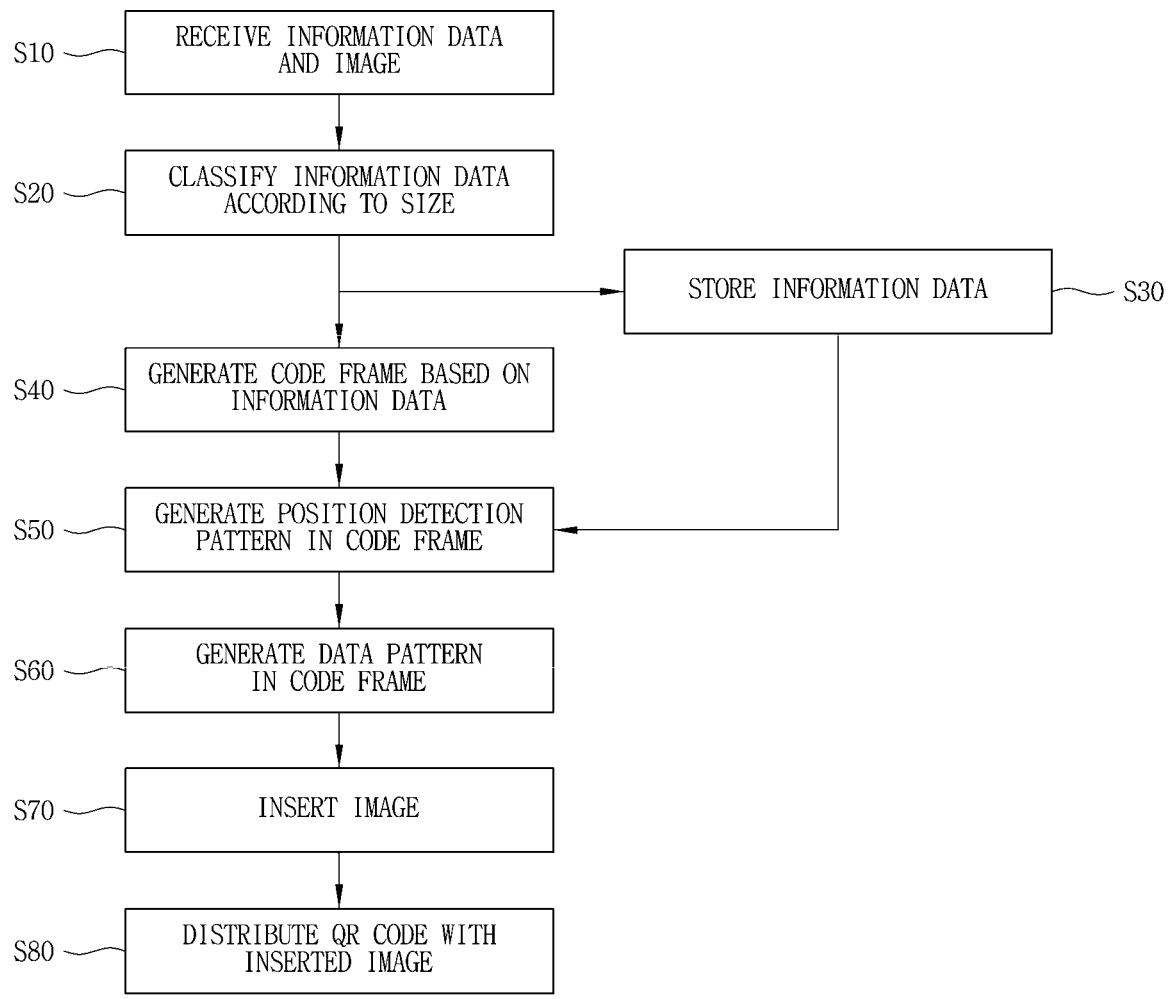
FIG. 6 is a diagram illustrating a method of generating a QR code with an inserted image according to an embodiment of the present disclosure.

FIG. 6 is a diagram illustrating a method of generating a QR code with an inserted image according to an embodiment of the present disclosure.

Hereinafter, for convenience of description, a method for generating the QR code according to an embodiment of the present disclosure shown in FIG. 2 will be described in detail. However, it will be apparent that the present embodiment may also be applied to the method for generating the QR code shown in each of FIGS. 3 and 4.

Referring to the drawing, a person who wants to generate a QR code 100, that is, a manufacturer, may access the code generating server 300 through his terminal 200 and transmit information data and an image on the QR code 100 to be generated to the code generating server 300 (S10).

The information data and the image transmitted from the manufacturer terminal 200 may include information to be provided to multiple users through the QR code 100, for example, images such as photos, documents, videos, web pages, etc., for individuals, companies, or their products, etc.

Next, the classification unit 320 of the code generating server 300 may classify the information data received through the input unit 310 according to the size or capacity thereof (S20).

For example, the information data may include low-capacity data, for example, simple images or documents, and high-capacity data, for example, video or complex web pages, compared to the low-capacity data.

The classification unit 320 may compare the size or capacity of the received information data with a set reference value, for example, a set size value or a set capacity value, and classify the information data into low-capacity data and high-capacity data based on a comparison result.

Also, the classification unit 320 may store the information data classified as high-capacity data in the database 340 (S30). At this time, the high-capacity data and a position value for a storage position thereof may be stored in the database 340.

Next, the code frame generating unit 331 of the code generating server 300 may generate a code frame 110 that may determine an overall layout of the QR code 100 based on the classified information data (S40).

The code frame generating unit 331 of the code manufacturing server 300 may generate a code frame 110 in a closed loop form. The code frame 110 may include a first frame 111 and a second frame 112 spaced apart from each other at a predetermined interval. The first frame 111 and the second frame 112 may be formed in a polygonal shape.

Next, the position detection pattern generating unit 333 may generate and arrange one or more position detection patterns 120 in a space formed by the interval between the first frame 111 and the second frame 112 of the code frame 110 (S50).

The position detection pattern 120 may be formed in a polygonal shape and may determine a direction or rotation angle of the QR code 100.

Next, the data pattern generating unit 335 may generate a data pattern 130 based on the information data in the space generated by the first frame 111 and the second frame 112 based on the previously generated position detection pattern 120 (S60).

The data pattern 130 may include a plurality of first data cells 131 and a plurality of second data cells 132 in a polygonal shape. Accordingly, the data pattern generating unit 335 may generate the data pattern 130 by arranging the plurality of first data cells 131 and second data cells 132 in the form of a single closed curve as shown in FIG. 2, may generate the data pattern 135 by arranging the plurality of first data cells 131 and second data cells 132 in a double closed curve shape as shown in FIG. 3, or may generate the data pattern 137 by arranging the plurality of first data cells 131 and second data cells 132 in a zigzag shape as shown in FIG. 4.

The data pattern generating unit 335 may record and store various information in the plurality of first data cells 131 and second data cells 132 by combining the plurality of first data cells 131 and second data cells 132 based on parameters, such as color, shape, position, and angle therebetween.

For example, a data code based on the information data, a security code for verification of the data code, and a version code for version confirmation of the QR code 100 may be recorded and stored according to a combination of plurality of first data cells 131 and second data cells 132.

The data pattern generating unit 335 may record data codes through a direct recording method or an indirect recording method based on a classification result of the information data by the classification unit 320.

For example, the data pattern generating unit 335 may record the information data classified as low-capacity data by the classification unit 320 into the plurality of first data cells 131 and second data cells 132 by the direct recording method.

This direct recording type data code may include all components of the corresponding information data, that is, the low-capacity data. Accordingly, when multiple users image the QR code 100 through a predetermined terminal, the users may immediately view the corresponding information data according to the data code recorded in the direct recording method.

In addition, the data pattern generating unit 335 may record the information data classified as high-capacity data by the classification unit 320 into the plurality of first data cells 131 and second data cells 132 through an indirect recording method.

The data code of the indirect recording method may include address information for accessing the database 340 of the code generating server 300 and a storage position value of the high-capacity information data stored in the database 340. Accordingly, when multiple users image the QR code 100 through a terminal, they may access the server in which the corresponding information data is stored according to the data code recorded in the indirect recording method to view the information data.

Meanwhile, the data pattern generating unit 335 may divide the space between the first frame 111 and the second frame 112 into a plurality of regions, and record each of the data code, the security code, and the version code in each region by combining the plurality of first data cells 131 and the second data cells 132. At this time, a size of the region in which the data code is recorded may be relatively larger than a region in which the security code and version code are recorded.

Next, the image inserting unit 337 may insert the image provided from the manufacturer terminal 200 into the internal region of the QR code 100, that is, the image area 140 inside the second frame 112 (S70). The inserted image may be an image of a photo or logo of an individual or a company or may be an image of a photo or logo of a product thereof.

The code generating server 300 may distribute the QR code 100 with an inserted image to a user terminal (not shown) through a wired/wireless network, or print the QR code 100 with an inserted image on various print mediums and distribute the same to a number of users (S80).

As described above, the QR code generating method of the present embodiment may generate the QR code 100 in various shapes by forming the polygonal code frame 110 that forms a closed loop, thereby increasing aesthetics compared to existing QR codes.

In addition, the QR code generating method of the present embodiment, by inserting various images, for example, a logo image, related to information to be provided from the QR code 100, allows multiple users to predict information included in the QR code 100 through visual recognition of the image inserted into the QR code, thereby increasing code identification, which may improve the advertisement effect for individuals, companies, or their products through the QR code 100.

The embodiments of the present disclosure have been described in detail, but the scope of the present disclosure is not limited thereto and various variants and modifications by a person skilled in the art using a basic concept of the present disclosure defined in claims also belong to the scope of the present disclosure.

It will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present disclosure.

What is claimed is:

1. A QR code comprising:
    a code frame including a first frame and a second frame formed inside the first frame and spaced apart from the first frame at a certain interval;
    one or more position detection patterns disposed in a space formed by the interval between the first frame and the second frame;
    a data pattern including a plurality of first data cells and a plurality of second data cells arranged along an outer circumferential surface of the code frame in the space, and in which a plurality of codes based on information data provided from outside are recorded; and
    an image inserted into an image area formed inside the second frame.

2. The QR code of claim 1, wherein each of the first frame and the second frame has a polygonal shape forming a closed loop.

3. The QR code of claim 1, wherein, in the data pattern, a data code, a security code, and a version code based on the information data are recorded according to a combination of the plurality of first data cells and second data cells.

4. The QR code of claim 3, wherein the data code is recorded in the data pattern in one of a direct recording method and an indirect recording method.

5. The QR code of claim 4, wherein the data code recorded in the indirect recording method includes an access address of an external server in which the information data is stored and a storage position value of the information data.

6. The QR code of claim 1, wherein the plurality of first data cells and second data cells are arranged in combination according to at least one of color, shape, arrangement position, and angle therebetween.

7. The QR code of claim 1, wherein the plurality of first data cells and the plurality of second data cells are arranged to have a single closed curve shape in the space.

8. The QR code of claim 1, wherein the plurality of first data cells and the plurality of second data cells are arranged to have a double closed curve shape in the space.

9. The QR code of claim 1, wherein the plurality of first data cells and the plurality of second data cells are arranged to have a zigzag shape in the space.

10. The QR code of claim 1, wherein the space is divided into a plurality of regions, and different types of codes are recorded in each region according to a combination of the plurality of first data cells and the plurality of second data cells of the data pattern.

11. A method of generating a QR code, the method comprising:
    receiving, by a code generating server, information data and an image from a manufacturer terminal;
    classifying the received information data into low-capacity data and high-capacity data and storing the high-capacity data in a database together with a storage position value;
    generating a first frame in a closed loop form and a second frame in a closed loop form spaced apart from the first frame at a predetermined interval inside the first frame based on the classified information data;
    generating one or more position detection patterns in a space between the first frame and the second frame;
    generating a data pattern in which a plurality of codes are recorded by combining a plurality of first data cells and a plurality of second data cells in the space based on the classified information data; and
    forming an image area inside the second frame and inserting the image into the image area.

12. The method of claim 11, wherein the generating of the data pattern includes combining and arranging the plurality of first data cells and the plurality of second data cells according to at least one of color, shape, arrangement position, and angle, and
    the plurality of first data cells and the plurality of second data cells are arranged in one of a single closed curve shape, a double closed curve shape, and a zigzag shape in the space.

13. The method of claim 11, wherein the generating of the data pattern includes:
    recording the low-capacity data of the classified information data as a data code in a direct recording method; and
    recording the high-capacity data of the classified information data as a data code in an indirect recording method,
    wherein the data code in the indirect recording method includes an access address of the data server in which the high-capacity data is stored and the storage position value.

14. The method of claim 11, wherein the generating of the data pattern includes:
    dividing the space into a plurality of regions; and
    recording different types of codes based on the classified information data in each region.

* * * * *